Patented July 11, 1950

2,514,386

UNITED STATES PATENT OFFICE 2,514,386

ELECTRODE COATING COMPOSITION

Charles T. Gayley, Lansdowne, Pa.

No Drawing. Application March 15, 1948,
Serial No. 15,039

4 Claims. (Cl. 219—8)

(Granted under the act of March 3, 1883, as
amended April 30, 1928; 370 O. G. 757)

The present invention concerns a composition of matter and particularly concerns a composition for coating a copper-zinc welding electrode for use in welding copper-zinc alloy, manganese bronze, brass and other metals and alloys by the electric-arc process.

In the art of electric-arc welding it is customary to weld together pieces of metal by means of an electric arc between the metal to be welded and a welding electrode. Conventionally the welding electrode is a rod formed of suitable metallic material that deposits to form the weld. In order to facilitate the welding operation and to insure deposition of a satisfactory weld, it is customary to coat the welding rod with a flux composition. A primary purpose of the flux coating is to provide a low-melting constituent that aids in effecting melting of the welding-rod material. Another purpose of the flux coating is to provide materials that upon heating evolve gas for forming a shield about the electric arc so as to protect the material of the welding rod from oxidation.

Conventional flux coatings for welding rods have a critical disadvantage in that some of the gases evolved such as carbon monoxide, carbon dioxide, and hydrogen remain in gaseous form during cooling of the deposited weld and are trapped by the deposited weld as it solidifies. Such trapped gases cause in the solidified weld a porosity that critically impairs its strength.

The flux coating of the present invention is critically different from conventional coatings in the elimination of all materials that on heating form gases that remain in gaseous form when cooled below a temperature of about 1,700° F. The flux coating of the present invention evolves, upon heating, gases that do not remain in such form below about 1,700° F. and which therefore do not cause porosity in the solidified weld.

The flux coating of the present invention has also a combination of other desirable properties including low melting point, solvent action on metallic oxides, volatility sufficient to maintain a shielding atmosphere around the welding arc, thermionic emissivity favorable to arc stabilization, and formation of a slag that covers and protects the deposited metal while cooling. The flux permits the deposition of solid and ductile weld metal using a copper-zinc alloy electrode rod and permits welding of heavy copper-zinc pieces without preheating thereof. The slag formed during welding has a lower specific gravity and lower melting point than the weld metal and therefore rises to the top of the weld and is not trapped in the solidifying weld metal. The covering melts off evenly with the electrode rod, it is not deliquescent or hygroscopic and transfer of the metal is effected as a fine spray.

An object of the invention is to provide a composition of matter.

Another object is to provide a composition for coating a welding electrode.

Another object is to provide an electrode coating that on heating evolves no gases that remain gaseous upon cooling below a temperature of about 1,700° F.

Another object is to provide a flux coating having low melting point, solvent action on metallic oxides, volatility sufficient to maintain a shielding atmosphere around the welding arc, thermionic emissivity favorable to arc stabilization, and formation of a slag that covers and protects the deposited metal while cooling.

Another object is to provide an electrode coating that permits deposition of solid and ductile weld metal using a copper-zinc alloy electrode rod and permits welding of heavy copper-zinc pieces without preheating.

Another object is to provide a coating that forms a slag having lower specific gravity and lower melting point than the weld metal, which slag therefore rises to the top and is not trapped in the weld metal.

Another object is to provide a flux coating that melts off evenly with the electrode rod, is not deliquescent or hygroscopic, and transfers the metal as a fine spray.

Further objects and advantages of this invention, as well as its ingredients and proportions thereof, are apparent from the following description.

The flux coating of the present invention comprises specific ingredients combined in specific proportions that are particularly useful in coating welding electrode rods used in welding copper-zinc alloy, manganese bronze, brass and other metals and alloys. The ingredients used are cryolite, fluorspar, lithium chloride, manganese, and sodium silicate. It is found that these ingredients can be combined in various proportions to produce a satisfactory flux coating. Preferably the proportions of ingredients are within the following ranges:

| | Per cent by weight |
|---|---|
| Cryolite | About 20 to 40 |
| Fluorspar | About 10 to 30 |
| Lithium chloride | About 3 to 15 |
| Manganese | About 3 to 15 |
| Sodium silicate | About 8 to 25 |

The flux coating is made by preparing the cryolite, fluorspar, lithium chloride and manganese in powdered or granular form. These ingredients are weighed to provide the selected proportions and are mixed in dry state. The dry mixture is dispersed in sodium silicate dissolved in water to a consistency of syrup to form a wet batch. The wet batch is applied to the electrode rod by extruding, dipping or in any other conventional manner. The coated electrodes are dried at room temperature, followed by baking in an oven or furnace at 300° F. to 800° F., and preferably at 700° F.

A preferred flux coating contains ingredients in accordance with the following example:

*Example*

| | Per cent by weight |
|---|---|
| Cryolite | About 40 |
| Fluorspar | About 20 |
| Lithium chloride | About 10 |
| Manganese | About 10 |
| Sodium chloride | About 20 |

The flux coating is made as described above.

In using a flux coating in accordance with the present invention proportions of the coating ingredients are selected in view of the composition of the welding rod. The ingredients in selected proportions are made into a coating composition and applied to the welding rod. The rod and flux coating are used in conventional manner to deposit a weld by the electric-arc process.

During the welding the flux coating evolves gases that form a shield about the arc to protect the weld metal from oxidation. Upon cooling the evolved gases are converted from a gaseous state so that they are not trapped as gases in the solidified weld and do not cause porosity therein.

In forming the weld the flux coating has a low melting point, solvent action on metallic oxides, volatility sufficient to maintain a shielding atmosphere around the welding arc, thermionic emissivity favorable to arc stabilization, and formation of a slag that covers and protects the deposited metal while cooling. The flux coating permits the deposition of solid and ductile weld metal using a copper-zinc alloy welding rod and permits the welding of heavy copper-zinc pieces without preheating. The slag formed during welding has lower specific gravity and lower melting point than the weld metal and therefore rises to the top and is not trapped in the solidifying weld metal. The flux coating melts off evenly with the electrode rod, is not deliquescent or hygroscopic and transfers the metal as a fine spray. The flux coating when used with a manganese bronze (copper-zinc alloy) electrode rod deposits weld metal having tensile strength of 61,000 to 65,000 lbs. per square inch and elongation of 30% to 39%.

It is understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A composition of matter consisting of:

| | Per cent by weight |
|---|---|
| Cryolite | About 20 to 40 |
| Fluorspar | About 10 to 30 |
| Lithium chloride | About 3 to 15 |
| Manganese | About 3 to 15 |
| Sodium silicate | About 8 to 25 |

2. A composition of matter consisting of:

| | Per cent by weight |
|---|---|
| Cryolite | About 40 |
| Fluorspar | About 20 |
| Lithium chloride | About 10 |
| Manganese | About 10 |
| Sodium silicate | About 20 |

3. A welding electrode including a core formed of copper-zinc alloy and a coating on said core consisting of:

| | Per cent by weight |
|---|---|
| Cryolite | About 40 |
| Fluorspar | About 20 |
| Lithium chloride | About 10 |
| Manganese | About 10 |
| Sodium silicate | About 20 |

4. A welding electrode including a core formed of copper-zinc alloy and a coating on said core consisting of:

| | Per cent by weight |
|---|---|
| Cryolite | About 20 to 40 |
| Fluorspar | About 10 to 30 |
| Lithium chloride | About 3 to 15 |
| Manganese | About 3 to 15 |
| Sodium silicate | About 8 to 25 |

CHARLES T. GAYLEY.

REFERENCES CITED

The following references are of record in the file of this patent:

UNITED STATES PATENTS

| Number | Name | Date |
|---|---|---|
| 648,831 | Bates | May 1, 1900 |
| 1,763,417 | Clarke | June 10, 1930 |
| 2,238,392 | Matush | Apr. 15, 1941 |
| 2,239,018 | Rogerson | Apr. 22, 1941 |
| 2,282,175 | Emerson | May 5, 1942 |
| 2,337,714 | Haim et al. | Dec. 28, 1943 |
| 2,357,125 | Miller | Aug. 29, 1944 |
| 2,403,110 | Miller | July 2, 1946 |
| 2,435,198 | Browne | Feb. 3, 1948 |

Certificate of Correction

Patent No. 2,514,386                                             July 11, 1950

CHARLES T. GAYLEY

It is hereby certified that error appears in the printed specification of the above numbered patent requiring correction as follows:

Column 3, line 22, for the words "Sodium chloride" read *Sodium silicate*;

and that the said Letters Patent should be read as corrected above, so that the same may conform to the record of the case in the Patent Office.

Signed and sealed this 24th day of October, A. D. 1950.

[SEAL]

THOMAS F. MURPHY,
                                                                              *Assistant Commissioner of Patents.*